United States Patent [19]

Raab

[11] 4,107,714
[45] Aug. 15, 1978

[54] ADJUSTING MECHANISM FOR MOVABLE PICTURE-TAKING OBJECTIVE

[75] Inventor: Karl-Heinz Raab, Bad Kreuznach, Fed. Rep. of Germany

[73] Assignee: Jos. Schneider & Co. Optische Werke, Bad Kreuznach, Fed. Rep. of Germany

[21] Appl. No.: 668,793

[22] Filed: Mar. 19, 1976

[30] Foreign Application Priority Data

Mar. 21, 1975 [DE] Fed. Rep. of Germany ....... 2512424

[51] Int. Cl.² .......................... G03B 3/00; G03B 13/02
[52] U.S. Cl. .................................... 354/196; 355/58; 355/71
[58] Field of Search ............................ 354/195, 196; 352/139–141; 355/55, 56, 58, 71; 353/97, 101; 350/186, 187, 255, 206, 184

[56] References Cited

U.S. PATENT DOCUMENTS

| | | | |
|---|---|---|---|
| 3,314,350 | 4/1967 | Husum | 355/58 X |
| 3,549,250 | 12/1970 | Pantenburg | 353/97 |
| 3,778,152 | 12/1973 | Raymond | 355/56 |
| 3,883,244 | 5/1975 | Whitaker | 354/196 |

Primary Examiner—John Gonzales
Attorney, Agent, or Firm—Karl F. Ross

[57] ABSTRACT

A photographic or cinematographic objective, bodily displaceable between an object plane and an image plane, has a lens mount slidably supported on a base which may be inclined at an acute angle to the generally horizontal optical axis. Two setting rings, one for adjusting the magnification ratio and the other for controlling a diaphragm, are mechanically connected by a spring-loaded linkage with a pair of cam-follower rollers bearing upon respective edges of two camming strips secured to the base whereby the two rings are counterrotated upon a movement of the objective mount in either direction. The roller-engaging strip edges advantageously are so oriented, in the case of a sloping base, as to oppose the spring force upon a downward movement of the lens mount so as to exert a braking action.

9 Claims, 4 Drawing Figures

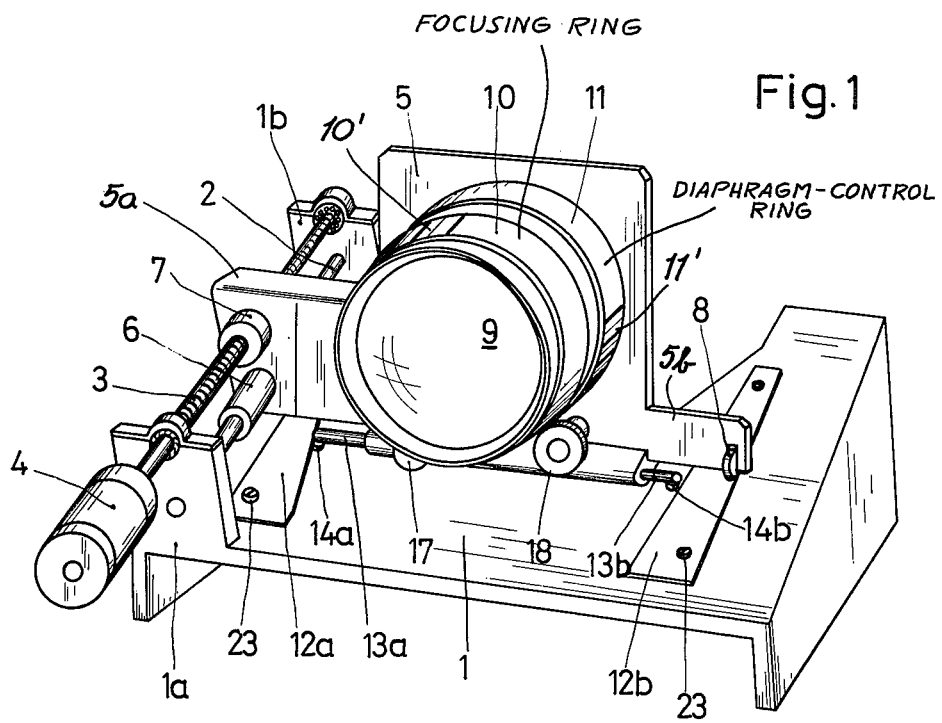
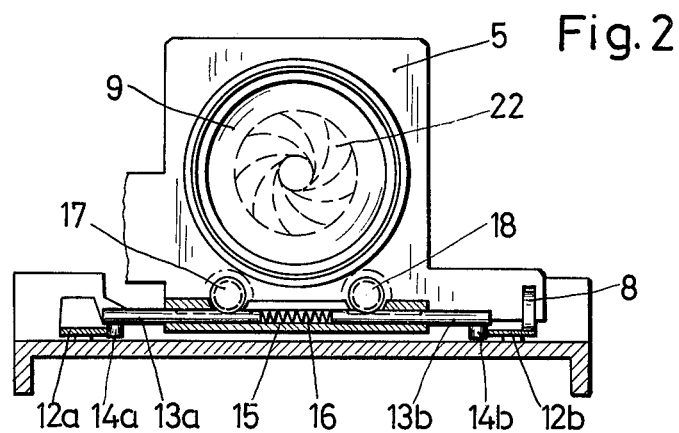

ADJUSTING MECHANISM FOR MOVABLE PICTURE-TAKING OBJECTIVE

FIELD OF THE INVENTION

My present invention relates to a mechanism for automatically adjusting a picture-taking objective which is movably mounted on a supporting base for displacement between two fixed planes that are generally perpendicular to its direction of motion, i.e. an object plane and an image plane.

BACKGROUND OF THE INVENTION

In the photographic or cinematographic reproduction of documents or other fixedly positioned objects, the size of an image projected by an objective upon a receiving surface, e.g. a xerographic sheet or a photosensitive plate or film, can be varied by displacing that objective toward one or the other plane, with simultaneous adjustment of the focal length through a shifting of one or more components of the objective (i.e. lenses or lens groups) along the optical axis. With constant illumination of the object, the brightness of the image varies inversely with magnification so that a compensatory adjustment of the effective aperture ratio is also desirable.

OBJECTS OF THE INVENTION

The general aim of my present invention is to provide, in a photographic or cinematographic system of this type, simple means for automatically varying the focal length and therefore the magnification ratio of an objective displaceable between an object plane and an image plane.

A more particular aim is to provide means for so correlating the focal length and the diaphragm opening of such an objective with its position as to allow the imaging of an object with different magnification ratios but substantially unvarying brightness by the manual or automatic operation of a single control such as, for example, a switch for the energization of a reversible drive motor serving to displace the objective.

SUMMARY OF THE INVENTION

In accordance with my present invention, a setting member on the displaceable objective is mechanically connected with cam-follower means engaging cam means on the supporting base, the coaction of the cam means and cam-follower means imparting a predetermined adjusting motion to the setting member for axially shifting one or more components of the objective, controlled by that member, upon a displacement of the objective mount on the base.

Pursuant to another feature of my invention, other cam and cam-follower means are similarly coupled with a second setting member controlling the adjustment of a diaphragm for the purpose of maintaining a substantially constant brightness of the projected image upon changes in magnification ratio.

The two setting members may be a pair of rings rotatable about the optical axis of the objective, the associated cam-follower means being connected with these rings via a common spring-loaded linkage tending to rotate the rings in opposite directions.

If the path of movement of the objective is vertical or inclined, i.e. if the base includes an angle greater than zero with the horizontal, the cam-follower means may be designed as rollers coacting with respective camming edges in such a way that a force component exerted by these edges upon the rollers opposes the spring force of the linkage upon downward movement and aids that spring force upon upward movement of the objective mount on the base, the linkage thus acting as a brake in the first and as an accelerator in the second instance. Such an inclined base may be used, with substantially vertical object and image planes, for the purpose of maintaining a reference edge of the projected image at a predetermined level despite changes in the magnification ratio.

BRIEF DESCRIPTION OF THE DRAWING

The above and other features of my invention will now be described in detail with reference to the accompanying drawing in which:

FIG. 1 is a perspective view of a picture-taking objective provided with an adjusting mechanism according to my invention;

FIG. 2 shows part of the mechanism of FIG. 1 in sectional elevation;

SPECIFIC DESCRIPTION

Figure 3:
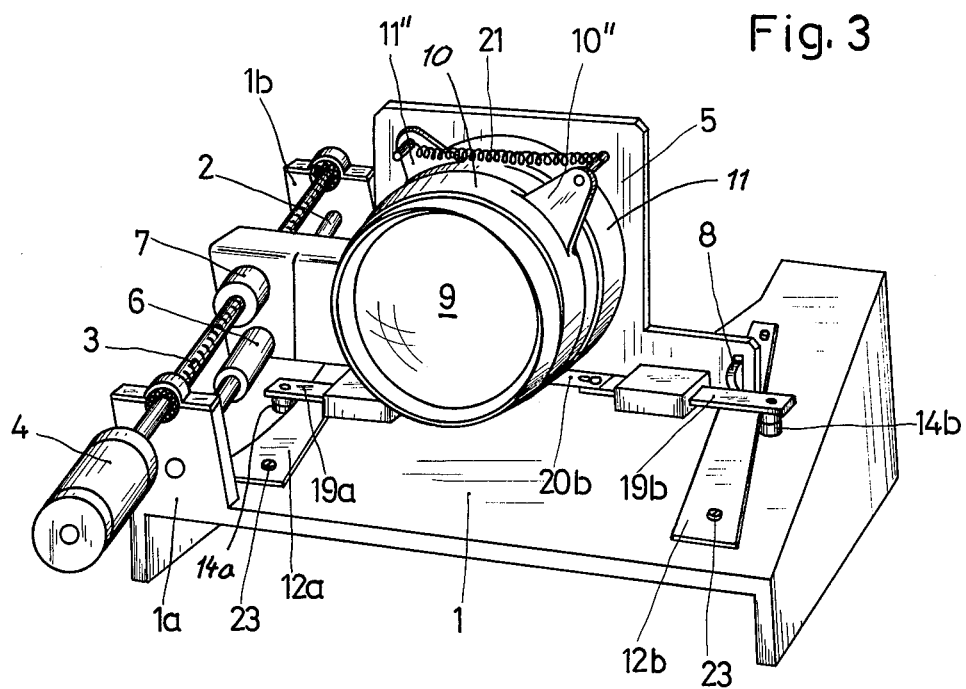
FIG. 3 is a view similar to FIG. 1, illustrating a modification.

In FIGS. 1 and 2 I have shown an objective 9 of adjustable focal length forming part of a copying machine whose conventional elements, not illustrated, include a housing with a document holder and a carrier for copy sheets to be exposed; a vertical object plane and a vertical image plane may be defined within the housing by that document holder and by an exposure window for the sensitized copy sheets or for a xerographic belt or drum, or by their virtual images formed by reflectors in the light path, as is well known per se. Objective 9, centered on a horizontal optical axis, includes one or more axially shiftable lenses whose displacement relative to an associated lens mount 5 is controlled by a focusing ring 10 rotatable about the axis. Another ring 11, coaxial with ring 10, controls a nonillustrated diaphragm to vary the effective aperture ratio of the objective.

Lens mount 5 comprises a frame with a pair of lateral extensions or wings 5a and 5b, wing 5a being rigid with a guide tube 6 traversed by a rod 2 which is fixedly supported on parallel lugs 1a and 1b of a base 1. Rotatably journaled in these lugs is a leadscrew 3 driven by a reversible motor 4, the leadscrew being engaged by a nut 7 fixedly held in wing 5a. The weight of the objective 9 is sustained by a supporting roller 8 journaled in the opposite wing 5b; two camming strips 12a and 12b, fixedly mounted on base 1, are overhung by wings 5a and 5b, with roller 8 bearing upon strip 12b. The close proximity of guide rod 2 and leadscrew 3 minimizes the excursions of nut 7 relative to the leadscrew due to any unevenness of strip 12b, thus obviating the risk of jamming.

Strips 12a and 12b have confronting edges coacting with respective rollers 14a and 14b serving as cam followers, these rollers being carried on a pair of aligned racks 13a and 13b movable in a transverse bore 15 of frame 5. A compression spring 16 in that bore tends to drive the racks 13a and 13b apart, thereby urging the rollers 14a and 14b toward their respective camming edges. Racks 13a and 13b mesh with two stepped pinions 17 and 18, pinion 17 engaging a set of peripheral teeth 10' of ring 10 whereas pinion 18 similarly co-operates with a set of teeth 11' of ring 11.

Limited changes in the position of strips 12a and 12b are possible upon a loosening of screws 23, passing through slots in the strips or in base 1, by which the strips are held above the sloping upper base surface with the aid of interposed spacers. Guide rod 2 and leadscrew 3 are inclined to the horizontal at the same angle as that base surface, the camming edges of strips 12a and 12b converging downwardly and forwardly whereby the racks 13a and 13b are driven toward each other against the force of spring 16 when the objective 9 and its mounting frame 5 descend along the base 1. The force of spring 16, accordingly, exerts a braking effect during this downward movement; conversely, that force aids in the reverse movement of the objective as the frame 5 ascends the supporting surface of base 1.

Upon forward movement of frame 5, with objective 9 approaching the object plane, the resulting clockwise rotation of ring 10 changes the focal length of the objective to increase the size of the picture projected upon the rearwardly located image plane, pursuant to the well-known mathematical relationship between focal length, object distance and image distance. At the same time, the counterclockwise rotation of ring 11 enlarges the diaphragm aperture to compensate for the loss of brightness inherent in this increased magnification ratio. The reverse movement of frame 5 has, of course, the opposite effect.

Motor 4 can be controlled by a nonillustrated switch to drive the leadscrew in one sense or the other.

Figure 4:
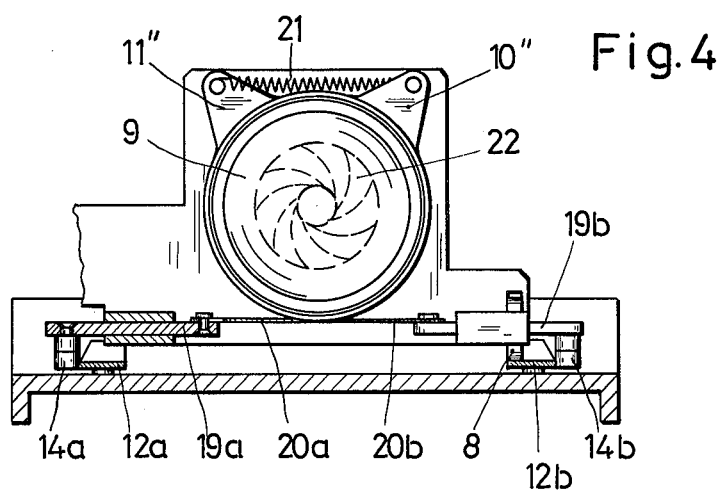
FIG. 4 is a view similar to FIG. 2, relating to the mechanism of FIG. 3.

In FIGS. 3 and 4 I have shown a modified linkage between rollers 14a, 14b on the one hand and rings 10 and 11 on the other hand. Strips 12a and 12b are here shown relatively inverted, with their camming edges facing away from each other and diverging in the forward and downward direction. The rollers are here mounted on a pair of tongues 19a and 19b connected with respective flexible elements 20a and 20b which are partly wound about the associated rings 10 and 11 and terminate at or near a pair of lugs 10", 11" projecting radially from these rings. The lugs 10" and 11" are urged toward each other by a tension spring 21 anchored thereto, the effect of the spring force being to draw the rollers 14a and 14b onto the corresponding camming edges. It will be noted that the same braking and accelerating effects are exerted upon downward and upward displacement of the objective as in the preceding embodiment.

Elements 20a and 20b, here shown as flat straps, could also be cords or wires.

Strips 12a and 12b, whose zero position can be selected with the aid of adjusting screws 23, are preferably made of a highly abrasion-resistant material.

I claim:

1. In a picture-taking apparatus comprising an objective displaceable between a fixed first plane and a fixed second plane for projecting an image of an object in said first plane with a variable magnification ratio upon said second plane, said objective being provided with an adjustable diaphragm and with at least one movable component for varying the focal length of said objective, the combination thereof with:

a base;

mounting means supporting said objective on said base, said mounting means being movable in a direction generally parallel to the optical axis of said objective;

a first setting member on said objective for adjusting said movable component;

a second setting member on said objective for adjusting said diaphragm;

first cam-follower means on said mounting means mechanically connected with said first setting member;

first cam means on said base engaged by said first cam-follower means for imparting a predetermined adjusting motion to said first setting member upon displacement of said mounting means on said base;

second cam-follower means mechanically connected with said second setting member; and second cam means on said base engaged by said second cam-follower means for imparting a predetermined adjusting motion to said second setting member upon displacement of said mounting means on said base.

2. The combination defined in claim 1 wherein said setting members are a pair of rings rotatable about said axis, said first and second cam-follower means being connected with said rings via a common spring-loaded linkage tending to rotate said rings in opposite directions.

3. The combination defined in claim 2 wherein said first and second cam means comprise a pair of strips rigid with said base on opposite sides of said axis and provided with respective camming edges, said first and second means being a pair of rollers urged by the spring force of said linkage into contact with said camming edges.

4. The combination defined in claim 3 wherein said base is inclined to the horizontal along the path of movement of said mounting means, said camming edges being oriented to exert upon said rollers a force component opposing said spring force upon downward movement and aiding said spring force upon upward movement of said mounting means on said base.

5. The combination defined in claim 3 wherein said rings are provided with peripheral gear teeth, said linkage including a pair of pinions respectively meshing with the gear teeth of said rings, a pair of racks for driving said pinions, and a compression spring bearing upon said racks.

6. The combination defined in claim 3 wherein said rings are provided with radially projecting lugs, said linkage including a pair of flexible elements extending around portions of the respective rings and a tension spring anchored to said lugs for drawing them toward each other.

7. The combination defined in claim 3 wherein said mounting means is a frame with two opposite extensions respectively overlying said strips, said base being provided with a guide rod traversing one of said extensions, the other of said extensions being provided with a supporting roller bearing upon said base.

8. The combination defined in claim 7 wherein said supporting roller bears upon said base through the intermediary of one of said strips.

9. The combination defined in claim 7 further comprising a leadscrew journaled in said base adjacent said guide rod, said one of said extensions being provided with a nut engaged by said leadscrew.

* * * * *